United States Patent [19]

Nakai

[11] 4,173,093
[45] Nov. 6, 1979

[54] COCKROACH CATCHING DEVICE

[75] Inventor: Tadanobu Nakai, Nara, Japan

[73] Assignee: Tokiwa Chemical Industries Limited, Osaka, Japan

[21] Appl. No.: 851,594

[22] Filed: Nov. 14, 1977

[30] Foreign Application Priority Data

Jun. 27, 1977 [JP] Japan .................... 52-84867[U]

[51] Int. Cl.² ............................................. A01M 1/10
[52] U.S. Cl. ................................................... 43/121
[58] Field of Search ...................... 43/121, 107, 131

[56] References Cited

U.S. PATENT DOCUMENTS

| 729,053 | 5/1903 | Finley | 43/121 |
| 970,528 | 9/1910 | Miller | 43/121 |
| 1,543,968 | 6/1925 | Williams et al. | 43/121 X |
| 1,770,330 | 7/1930 | Warden | 43/121 |
| 2,346,744 | 4/1944 | Glassman | 43/121 X |

FOREIGN PATENT DOCUMENTS 741135 12/1932 France ........................... 43/121

Primary Examiner—Nicholas P. Godici
Assistant Examiner—K. Bradford Adolphson
Attorney, Agent, or Firm—Mason, Fenwick & Lawrence

[57] ABSTRACT

A first embodiment of a cockroach catching device has a hollow circular housing including a floor portion, has legs supporting the floor portion a spaced distance above a supporting surface and a downwardly facing opening in the center of the floor portion, an inverted conical surface panel extends upwardly from the entrance opening and has an upper edge termination with a downwardly extending wall edge positioned above the upper edge to define an entrance slot of sufficient width to permit a cockroach to pass through the slot to enter said housing. A second embodiment has a rectangular housing with a planar passageway panel and entrance cover panel defining an entrance slot.

2 Claims, 4 Drawing Figures

COCKROACH CATCHING DEVICE

BACKGROUND AND SUMMARY OF THE INVENTION

This invention is in the field of insect traps and is more specifically directed to an improvement in a cockroach trap providing a foolproof and effective trapping of cockroaches which is also basically simple in construction and consequently economical to fabricate and maintain.

It is the principal object of this invention to provide a new and improved cockroach catching device.

A further object of the invention is the provision of a new and improved cockroach trap means of simplified construction which is easy to assemble and operate and which is highly effective in the catching of cockroaches.

Achievement of the foregoing objects of this invention is enabled by the embodiments of the invention in a manner which will become apparent when the following detailed description is considered in conjunction with the appended drawings in which:

DESCRIPTION OF THE PREFERRED EMBODIMENTS

Figure 1:
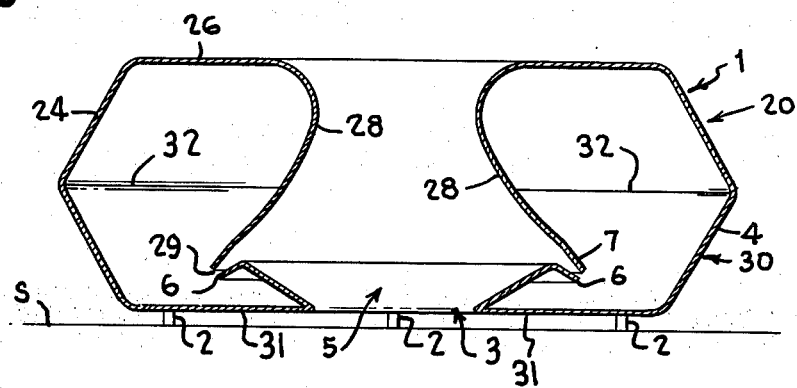
FIG. 1 is a bisecting sectional view of a first embodiment of the invention.
Figure 2:
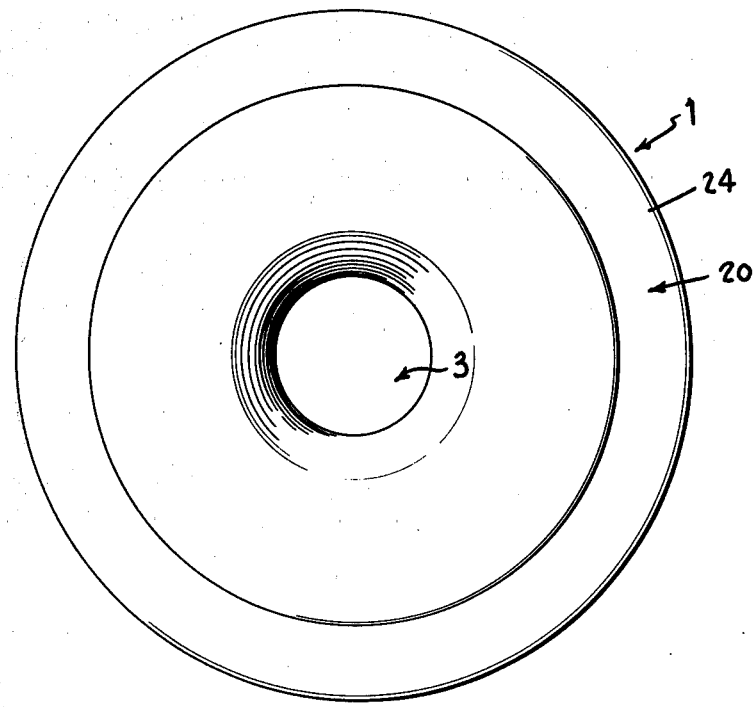
FIG. 2 is a top plan view of the first embodiment.

Turning first to the first embodiment which is illustrated in FIGS. 1 and 2, the main element of the embodiment comprises a hollow housing having a circular periphery with the housing including an upper portion 20 and a lower portion 30 joined along a medial juncture 32. The housing is formed of any suitable material such as paper, plastic or the like and the lower portion 30 includes an annular floor portion 31 having a central axial opening 3 and upwardly and outwardly inclined slanting wall 4 which is in the form of a portion of an inverted cone. Leg members 2 extend downwardly from the floor portion 31 so as to support the floor portion a spaced distance above the supporting surface S on which the device is positioned. The distance between the supporting surface S and the lower surface of the floor portion is sufficient to permit a cockroach to move across the supporting surface beneath the floor portion 31 to enter the central axial openings 3. An upwardly outwardly diverging passageway panel 5 of inverted conical shape extends upwardly above the central axial opening and has an upper annular downwardly extending lip portion 6 extending outwardly unitarily from its upper extent.

The upper housing portion 20 includes an inwardly inclined slanting wall 24 which consists of a portion of a cone and a flat annular upper surface 26 extends radially inwardly from the upper termination of the inclined slanting wall 24. A downwardly extending internal wall in the shape of a compound surface of revolution 28 extends downwardly from the inner edge termination of the flat annular upper surface 26 and has a lower end edge portion 7 spaced from, but adjacent, the edge of the downwardly extending lip portion 6 with which it cooperates to define an annular slot 29 of sufficient width to permit the passage of a cockroach. However, the annular slot 29 is no larger than is necessary to permit the passage of a cockroach through the slot.

Additionally, it will be observed that the portions 6 and 7 are canted with respect to each other so that a cockroach can move upwardly along the passageway panel 5 and downwardly through the slot 29 with any engagement or forced squeezing of the cockroach through the slot tending to open the slot to permit the passage of the cockroach therethrough downwardly onto the upper surface of the floor portion 31. However, the canted orientation of the parts 6 and 7 precludes opening or enlargement of the slot if a cockroach should attempt to exit from the internal chamber of the housing in an opposite direction.

The embodiment of FIGS. 1 and 2 is used by positioning food or other suitable cockroach bait beneath the central axial opening 3 after the device has been positioned in a location frequented by cockroaches. The natural inclination of the cockroach is to climb upwardly through the central opening and then downwardly along the upper surface of the lip portion 6 through the annular slot 29 into the interior of the housing. The inner walls of the passageway panel 5 and the slanting walls 4, 24 and the inner surface of the upper flat annular member 26 as well as the inner surface of the internal wall 28 can be provided with a coating of material which prevents the cockroaches on the interior of the housing from climbing the walls. Consequently, the cockroaches cannot gain access to the annular slot 29 to escape from within the housing. Moreover, even if the cockroaches could gain access to the inner extent of the annular slot 29, the canted orientation of the end edge 7 with respect to the downwardly extending lip portion 6 would tend to prevent their exit from the interior of the housing.

Figure 3:
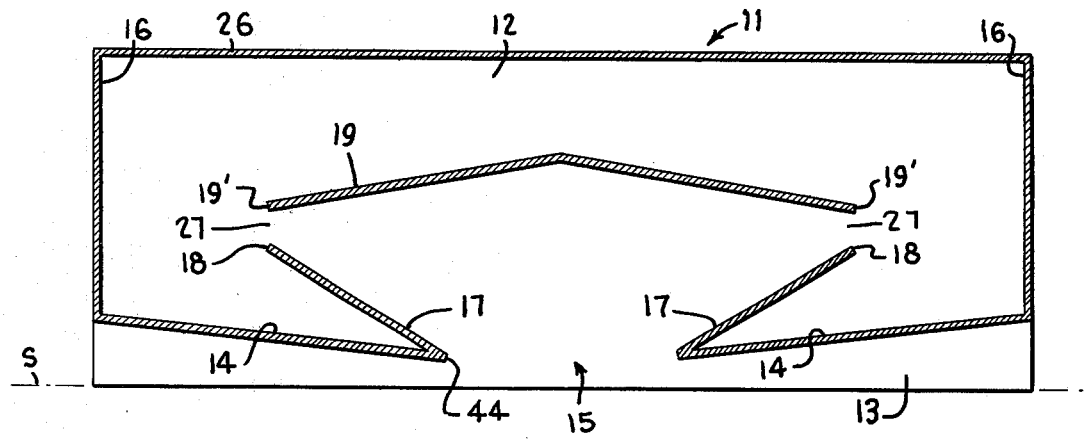
FIG. 3 is a bisecting sectional view of a second embodiment of the invention.
Figure 4:
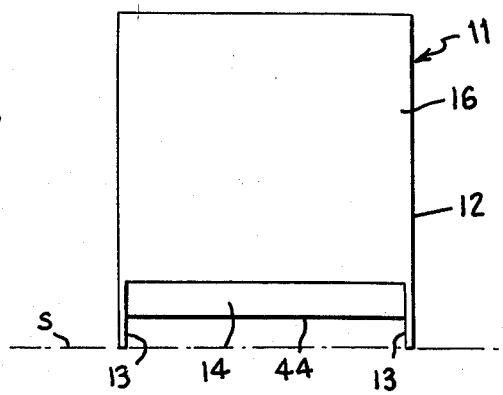
FIG. 4 is an end elevation of the embodiment of FIG. 3.

FIGS. 3 and 4 illustrate a second embodiment of the invention which is of generally rectangular configuration as opposed to the circular configuration of the first embodiment. The second embodiment, generally designated 11, includes first and second parallel side walls 12 which are connected adjacent their end portions by first and second parallel end walls 16. A bottom wall 14 extends downwardly from the lower edge of each of the end walls 16 with the bottom walls 14 terminating at a lower end edge portion 44 with the space between the edge portions 44 defining an entrance opening 15. It will be observed that the bottom walls 14 are spaced above a supporting surface S on which the lower portions 13 of the side walls rest; lower portions 13 function as leg portions which maintain the bottom walls 14 a desired distance spaced above the supporting surface S which is adequate to permit the passage of a cockroach beneath the bottom wall portions 14 to the entrance opening 15. Upwardly inclined diverging passageway panels 17 extend upwardly and outwardly from the edge terminations 44 of the bottom wall members 14 with each of the passageway panel members 17 having an upper edge termination 18 as shown in FIG. 3. An entrance cover panel 19 overlies the entrance 15 and consists of first and second planar components which are centrally bent and inclined with respect to each other with each having lower edge portions 19' overlying and spaced from the upper edge portions 18 of the passageway panel members 17 to define a slot 27 therebetween. The slot 27 between the edges 18 and 19' is of sufficient width to permit the passage of a cockroach but is no larger than is necessary for this purpose.

The device of the second embodiment is used in essentially the same manner as the first embodiment with bait being positioned beneath the entrance opening 15 to attract the cockroaches into the vicinity of the entrance opening from which they enter the opening following their natural inclinations and climb upwardly along the passageway panel members 17. The cockroaches then pass through the slot 27 defined between the edge portions 18 and 19' from which they drop onto the bottom wall 14. The location and configuration of the slot 27 is such to preclude the exit of the cockroaches from the interior of the housing. Additionally, the lower surfaces of the passageway panels 17 can be provided along with the side panels 12, top of cover panel 19 and end panels 16 with a low-friction coating or the like on which the cockroaches cannot climb. Consequently, it will be seen that the second embodiment is like the first embodiment in that it provides a uniquely simple, yet effective, device for catching cockroaches. Numerous modifications of the preferred embodiments disclosed herein will undoubtedly occur to those of skill in the art and it should be understood that the spirit and scope of the invention is to be limited solely by the appended claims.

I claim:

1. A cockroach catching device comprising a hollow housing of generally circular configuration as viewed from above including means defining a floor portion of annular configuration, means supporting said floor portion a predetermined spaced distance above a supporting surface, a downwardly facing entrance opening provided adjacent said floor portion, inclined passageway panel means formed of non-perforated material extending upwardly and outwardly flaring from said entrance opening, said passageway panel means having an edge termination spaced above said floor portion, downwardly extending means positioned above said passageway panel means and having a lower edge portion spaced from the edge termination of said passageway panel means to define an entrance slot therebetween, said entrance slot being of sufficient width to permit a cockroach to pass therebetween to enter said housing, said entrance slot being positioned above said floor portion and dimensioned so as to preclude exit of a cockroach from said housing through said entrance slot wherein said downwardly facing entrance opening is provided axially with respect to said floor portion, said inclined passageway panel comprises an inverted conical section portion extending upwardly from the edge of said downwardly facing entrance opening and a downwardly extending lip portion of conical section shape extending downwardly from the upper edge of said inclined passageway panel and having a lower edge portion comprising said edge termination of said passageway panel means and wherein said housing includes an upper portion and a lower portion joined along a medial juncture, said upper portion including a flat annular upper surface and a downwardly and outwardly inclined conical panel having a lower edge terminating at said medial juncture and said lower portion includes said annular floor portion and an upwardly and outwardly inclined slanting conical surface wall having an upper edge terminating at said medial juncture.

2. A cockroach catching device comprising a hollow housing a generally rectangular configuration including means defining a floor portion, means supporting said floor portion a predetermined spaced distance above a supporting surface, a downwardly facing entrance opening provided adjacent said floor portion, inclined passageway panel means formed of non-perforated material extending upwardly and outwardly flaring from said entrance opening, said passageway panel means having an edge termination spaced above said floor portion, downwardly extending means positioned above said passageway panel means and having a lower edge portion spaced from the edge termination of said passageway panel means to define an entrance slot therebetween, said entrance slot being of sufficient width to permit a cockroach to pass therebetween to enter said housing, said entrance slot being positioned above said floor portion and dimensioned so as to preclude exit of a cockroach from said housing through said entrance slot wherein said housing includes first and second end walls of planar configuration joined by first and second parallel side walls of planar configuration each having a lower edge termination and a horizontally extending top wall of planar configuration, said end walls being of less vertical height than said side walls but having coextensive parallel upper edge portions, said means defining said floor portion comprising first and second planar bottom walls extending inwardly and canted downwardly from the lower edge termination of said end walls and each of said bottom walls having a lower edge termination spaced from the lower edge termination of the other with the space between said lower edge terminations of said bottom walls defining said downwardly facing entrance opening.

* * * * *